Patented Feb. 20, 1934

1,947,951

UNITED STATES PATENT OFFICE 1,947,951

ACIDYL POLYALKYLENE POLYAMINES

Wilhelm Neelmeier, Theodor Nocken, and Hermann Friedrich, Leverkusen-on-the-Rhine, Germany, assignors, by mesne assignments, to General Aniline Works, Inc., New York, N. Y., a corporation of Delaware No Drawing. Application May 27, 1930, Serial No. 456,280, and in Germany May 29, 1929

20 Claims. (Cl. 260—124)

The present invention relates to new condensation products from higher aliphatic acids and polyalkylene polyamines and to a process of preparing same, more particularly it relates to condensation products which may be represented by the probable general formula:

Y—CO—NH—A—Z wherein A represents the group CHR—CHR$_1$— NH— of which there are two or more serially arranged, R and R$_1$ standing for hydrogen or methyl, wherein Y stands for an aliphatic hydrocarbon radical, preferably one containing at least 9 carbon atoms, which hydrocarbon radical may contain one or more double bonds and may be substituted by hydroxy groups, that is, the grouping Y—CO stands for the acidyl radical of a saturated or unsaturated fatty acid or hydroxy fatty acid, for example, a radical of lauric acid, palmitic acid, stearic acid, oleic acid, ricinoleic acid, Z stands for hydrogen or an aliphatic acidyl radical derived from a saturated or unsaturated fatty acid, preferably one containing at least 10 carbons atoms which may be substituted by hydroxy groups.

The preferred condensation products may be represented by the formula:

Y—CO—NH—CHR—CHR$_1$—NH—CHR— CHR$_1$—NH—Z wherein Y, R and R$_1$ are defined as above and Z stands for hydrogen, an aliphatic acidyl,—CHR —CHR$_1$—NH$_2$ or —CHR—CHR$_1$—NH— aliphatic acidyl in which the R's are defined as above and the aliphatic acidyl is derived from a saturated or unsaturated fatty acid which may be substituted by hydroxy groups, preferably such an acid as contains at least 10 carbon atoms.

H$_2$N—A—H wherein A is defined as above for example, diethylene triamine: NH$_2$—C$_2$H$_4$—NH—C$_2$H$_4$— NH$_2$, dipropylene triamine:

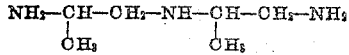

(obtainable by acting upon propylene chloride with ammonia at 120° C. and under a pressure of 10 atmospheres and distilling off the propylene diamine formed), triethylene tetramine:

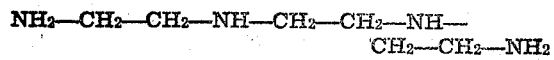

and a higher aliphatic saturated or unsaturated fatty acid, preferably such a one as contains at least 10 carbon atoms, or an ester of such a fatty acid, for example, the ethyl esters or advantageously the glycerides as occurring in nature, such as animal and vegetable fats and oils.

The quantities of the two components reacting upon each other may be varied within the widest limits, but generally it is best to work with an excess of the base, say with double the calculated quantity or more. When starting with the free aliphatic acid, the reaction is preferably carried out by mixing together the two components at room temperature and distilling off the excess of amine and water formed in vacuo, say under a pressure of about 10 mm. When starting with the esters of the aliphatic acids the reaction mixture is heated for several hours, say 2–4 hours, to 130–250° C., then the excess of base and the alcohol formed are distilled off under reduced pressure.

A preferred method of carrying out our process is achieved by starting with the mixture of bases obtainable by heating 80–120° C. ethylene chloride with ammonia under pressure and distilling off the ethylene diamine formed, said mixture containing piperazine besides the amines having chain form.

According to our process there is obtained a mixture of monoacidyl polyalkylene polyamines and diacidyl polyalkylene polyamines. The two components can be separated by fractional crystallization from alcohol, the diacidyl product being more difficultly soluble than the monoacidyl product. The best method of separating the two reaction products is by using diluted hydrochloric acid in which the monoacidyl product is soluble, the diacidyl product being insoluble or scarcely soluble therein.

Our new products are oily or solid substances, the monoacidyl products being soluble in dilute hydrochloric acid, acetic acid, alcohol, fat, such as linseed oil, insoluble or sparingly soluble in water, insoluble in alkalies; the diacidyl compounds are insoluble in dilute hydrochloric acid, water and alkalies, soluble in hot alcohol. The monoacidyl product as well as the mixtures of the mono- and di-acidyl products yield strongly lathering solutions in diluted hydrochloric and acetic acid. Our new products are valuable intermediate substances in the manufacture of wetting agents, some of them being used as such immediately.

The invention is illustrated by the following examples, without being restricted thereto:

Example 1.—100 parts by weight of olive oil and 100 parts by weight of diethylenetriamine are heated to about 180-200° C. until a test portion of the reaction mixture is soluble in dilute hydrochloric acid. After distilling off the excess of diethylene-triamine, advantageously under reduced pressure, there remains a strongly viscous mass, the hydrochloric acid solution of which has great foam forming properties.

A similar product is obtainable by heating free oleic acid with a large excess of diethylene-triamine under the same conditions.

*Example 2.*—310 parts by weight of the ethylester of oleic acid are heated with 286 parts by weight of triethylenetetramine at about 160° C. for 12 hours when a homogeneous solution is formed; the alcohol formed and the excess of triethylenetetramine are distilled off. The residual reaction product forms a brown oil, which is difficultly soluble in water and readily soluble in alcohol, benzene and dilute hydrochloric acid.

A quite similar product is obtainable by heating free oleic acid with an excess of triethylenetetramine to about 180-200° C. and distilling off the excess of triethylenetetramine under reduced pressure.

*Example 3.*—200 parts by weight of olive oil are heated at 180-200° C. with 300 parts by weight of a mixture of bases, which is obtained by the action of ammonia on ethylene chloride at 80-120° C. under pressure of 10 atm. and after distilling off the ethylene diamine said mixture of bases boiling at about 15 mm mercury between 90 and 300° C. When a test portion of the reaction product is smoothly soluble in dilute hydrochloric acid the water formed and the excess bases are distilled off under reduced pressure and a yellowish brown oil is obtained, a solution of which in dilute hydrochloric acid can be used as a washing or wetting agent.

*Example 4.*—Equal parts by weight of stearic acid and triethylene-tetramine are heated at 200-210° C. (oil bath temperature) until a test of the reaction product is soluble in dilute hydrochloric acid. After distilling off the excess triethylenetetramine there remains a nearly colorless mass which solidifies after cooling, being soluble in alcohol and dilute hydrochloric acid. The hydrochloric acid solution shows pronounced foam forming properties.

Instead of stearic acid other higher fatty acids, for example linseed oil, ricinoleic acid, acids of wool fat and the like, may be used.

*Example 5.*—Equal parts of linseed oil and the mixture of bases (described in Example 3) are heated for about 5 hours to 200-205° (oil bath temperature) and the excess free bases and the glycerine formed during the reaction are distilled off under reduced pressure. The remaining oil is easily soluble in dilute hydrochloric acid and shows good foaming and emulsifying properties.

Instead of linseed oil also other fats, for example, train oils, wool fat, beef fat and the like may be used.

We claim:
1. The process which comprises causing one molecular proportion of a compound of the group consisting of higher aliphatic fatty acids and esters thereof and at least two molecular proportions of a polyalkylene polyamine of the general formula:

$H_2N-CHR-CHR_1-NH-CHR-CHR_1-NH-X$ wherein R and $R_1$ stand for hydrogen or methyl and X stands for hydrogen or $-CHR-CHR_1-NH_2$ in which the R's are defined as above, to react upon each other at elevated temperature.

2. The process which comprises causing one molecular proportion of an ester of a higher aliphatic acid and at least two molecular proportions of a polyalkylene polyamine of the general formula:

$H_2N-CHR-CHR_1-NH-CHR-CHR_1-NH-X$ wherein R and $R_1$ stand for hydrogen or methyl and X stands for hydrogen or $-CHR-CHR_1-NH_2$ in which the R's are defined as above, to react upon each other for several hours at a temperature between 130 and 250° C.

3. The process which comprises causing one molecular proportion of an ester of a monobasic higher aliphatic acid, the acid radical containing at least 10 carbon atoms, and at least two molecular proportions of a polyalkylene polyamine of the general formula:

$H_2N-CHR-CHR_1-NH-CHR-CHR_1-NH-X$ wherein R and $R_1$ stand for hydrogen or methyl and X stands for hydrogen or $-CHR-CHR_1-NH_2$ in which the R's are defined as above to react upon each other for several hours at a temperature between 130 and 250° C.

4. The process which comprises causing one molecular proportion of an ester of a monobasic higher aliphatic acid, the acid containing 16-18 carbon atoms, and at least two molecular proportions of a polyalkylene polyamine of the general formula:

$H_2N-CH_2-CH_2-NH-CH_2-CH_2-NH-X$ wherein X may be hydrogen or $-CH_2-CH_2-NH_2$, to react upon each other for several hours at a temperature between 130 and 250° C.

5. The process which comprises causing one molecular proportion of a glyceride of a monobasic higher aliphatic acid, the acid containing 16-18 carbon atoms, and at least two molecular proportions of a polyalkylene polyamine of the general formula:

$H_2N-CH_2-CH_2-NH-CH_2-CH_2-NH-X$ wherein X may be hydrogen or $-CH_2-CH_2-NH_2$, to react upon each other for several hours at a temperature between 130 and 250° C.

6. The process which comprises heating one molecular proportion of linseed oil with at least two molecular proportions of a polyalkylene polyamine of the general formula:

$H_2N-CH_2-CH_2-NH-CH_2-CH_2-NH-X$ wherein X may be hydrogen or $-CH_2-CH_2-NH_2$, to react upon each other for several hours at a temperature between 130 and 250° C.

7. The process which comprises causing an ester of a monobasic higher aliphatic acid, the acid containing 16-18 carbon atoms, and an about equal part by weight of the mixture of bases obtained by the action of ammonia on ethylene chloride at 80-120° C. under a pressure of 10 atm. and distilling off the ethylene diamine, to react upon each other for several hours at a temperature between 130 and 250° C.

8. The process which comprises causing a glyceride of a monobasic higher aliphatic acid, the acid containing 16-18 carbon atoms, and an about equal part by weight of the mixture of bases obtained by the action of ammonia on ethylene chloride at 80-120° C. under a pressure of 10 atm.

and distilling off the ethylene diamine, to react upon each other for several hours at a temperature between 130 and 250° C.

9. The process which comprises causing equal parts by weight of linseed oil and the mixture of bases obtained by the action of ammonia on ethylene chloride at 80–120° C. under a pressure of 10 atm. and distilling off the ethylene diamine, to react upon each other for several hours at a temperature between 130 and 250° C.

10. Condensation products from higher aliphatic fatty acids and polyalkylene polyamines of the probable general formula:

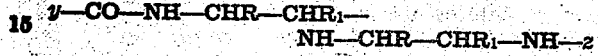
$y$—CO—NH—CHR—CHR$_1$—
NH—CHR—CHR$_1$—NH—$z$ wherein R and R$_1$ stand for hydrogen or methyl, $y$ stands for an aliphatic hydrocarbon radical containing at least 9 carbon atoms which may contain double bonds and which may be substituted by hydroxy groups, and $z$ stands for hydrogen, an aliphatic acidyl, —CHR—CHR$_1$—NH$_2$ or —CHR—CHR$_1$—NH—aliphatic acidyl in which the R's are defined as above and the aliphatic acidyl is derived from a saturated or unsaturated fatty acid which may be substituted by hydroxy groups, said acid containing at least 10 carbon atoms, said products being oily or solid substances, the monoacidyl products being soluble in dilute hydrochloric acid, acetic acid, alcohol, fat, insoluble in water and alkalies, the diacidyl compounds being soluble in hot alcohol, insoluble in hydrochloric acid, alkalies and water, being valuable wetting agents or intermediate products in the manufacture of wetting agents.

11. Condensation products from higher aliphatic fatty acids and polyalkylene polyamines of the probable general formula:

$y$—CO—NH—CHR—CHR$_1$—
NH—CHR—CHR$_1$—NH—$z$ wherein R and R$_1$ stand for hydrogen or methyl, $y$ stands for an aliphatic hydrocarbon radical containing at least 9 carbon atoms which may contain double bonds and which may be substituted by hydroxy groups, and wherein $z$ stands for hydrogen or —CHR—CHR$_1$—NH$_2$ in which R and R$_1$ are defined as above, said products being oily or solid substances, being soluble in dilute hydrochloric acid, acetic acid, alcohol, fat, insoluble in water and alkalies, being valuable wetting agents and intermediate products in the manufacture of wetting agents.

12. Condensation products from higher aliphatic fatty acids and polyalkylene polyamines of the probable general formula:

$y$—CO—NH—CHR—CHR$_1$—
NH—CHR—CHR$_1$—NH—$z$ wherein R and R$_1$ stand for hydrogen or methyl, $y$ stands for an aliphatic hydrocarbon radical containing from 15 to 17 carbon atoms which may contain double bonds and which may be substituted by hydroxy groups, and $z$ stands for hydrogen, an aliphatic acidyl, —CHR—CHR$_1$—NH$_2$ or —CHR—CHR$_1$—NH—aliphatic acidyl in which the R's are defined as above and the aliphatic acidyl is derived from a saturated or unsaturated fatty acid which may be substituted by hydroxy groups, said acid containing from 16 to 18 carbon atoms, said products being oily or solid substances, the monoacidyl products being soluble in dilute hydrochloric acid, acetic acid, alcohol, fat, insoluble in water and alkalies, the diacidyl compounds being soluble in hot alcohol, insoluble in hydrochloric acid, alkalies and water, being valuable wetting agents or intermediate products in the manufacture of wetting agents.

13. Condensation products from higher aliphatic fatty acids and polyalkylene polyamines of the probable general formula:

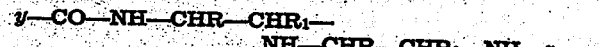
$y$—CO—NH—CHR—CHR$_1$—
NH—CHR—CHR$_1$—NH—$z$ wherein R and R$_1$ stand for hydrogen or methyl, $y$ stands for an aliphatic hydrocarbon radical containing from 15 to 17 carbon atoms which may contain double bonds and which may be substituted by hydroxy groups, $z$ stands for hydrogen or —CHR—CHR$_1$—NH$_2$ in which R and R$_1$ are defined as above, said products, being oily or solid substances, being soluble in dilute hydrochloric acid, acetic acid, alcohol, fat, insoluble in water and alkalies being valuable wetting agents and intermediate products in the manufacture of wetting agents.

14. Condensation products from higher aliphatic fatty acids and polyalkylene polyamines of the probable general formula:

$y$—CO—NH—CH$_2$—CH$_2$—
NH—CH$_2$—CH$_2$—NH—$z$ wherein $y$ stands for an aliphatic hydrocarbon radical containing from 15 to 17 carbon atoms which may contain double bonds and which may be substituted by hydroxy groups, $z$ stands for hydrogen, an aliphatic acidyl, —CH$_2$—CH$_2$—NH$_2$ or —CH$_2$—CH$_2$—NH—aliphatic acidyl, the aliphatic acidyl being derived from a saturated or unsaturated fatty acid which may be substituted by hydroxy groups and which contains from 16 to 18 carbon atoms, said products being oily or solid substances, the monoacidyl products being soluble in dilute hydrochloric acid, acetic acid, alcohol, fat, insoluble in water and alkalies, the diacidyl compounds being soluble in hot alcohol, insoluble in hydrochloric acid, alkalies and water, being valuable wetting agents or intermediate products in the manufacture of wetting agents.

15. Condensation products from higher aliphatic fatty acids and polyalkylene polyamines of the probable general formula:

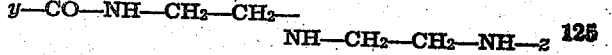
$y$—CO—NH—CH$_2$—CH$_2$—
NH—CH$_2$—CH$_2$—NH—$z$ wherein $y$ stands for an aliphatic hydrocarbon radical containing from 15 to 17 carbon atoms which may contain double bonds and which may be substituted by hydroxy groups, and $z$ stands for hydrogen or —CH$_2$—CH$_2$—NH$_2$, said products, being oily or solid substances, being soluble in dilute hydrochloric acid, acetic acid, alcohol, fat, insoluble in water and alkalies and being valuable wetting agents and intermediate products in the manufacture of wetting agents.

16. Condensation products from higher aliphatic fatty acids and polyalkylene polyamines of the probable general formula:

$C_{17}H_{33}CO$—NH—CH$_2$—
CH$_2$—NH—CH$_2$—CH$_2$—NH—$z$ wherein $z$ stands for hydrogen or —CH$_2$—CH$_2$—NH$_2$, said products, being oily substances, soluble in dilute hydrochloric acid, acetic acid, alcohol, fat, insoluble in water and alkalies and being valuable wetting agents and intermediate products in the manufacture of wetting agents.

17. As new products, the condensation products from higher aliphatic acids and a mixture of bases, said mixture being obtainable by the action of ammonia on ethylene chloride at 80–120° C. under a pressure of 10 atmospheres and after distilling off the ethylene diamine, said mixture of bases boiling at about 15 mm of mercury between about 90 and 300° C., said products being oily substances, soluble in dilute hydrochloric acid, acetic acid, alcohol, fat, insoluble in water and alkalies and being valuable wetting agents and intermediate products in the manufacture of wetting agents.

18. As a new product, the condensation product from olive oil and a mixture of bases, said mixture being obtainable by the action of ammonia on ethylene chloride at 80–120° C. under a pressure of 10 atmospheres and after distilling off the ethylene diamine, said mixture of bases boiling at about 15 mm of mercury between about 90 and 300° C., said product being a yellowish-brown oil, soluble in dilute hydrochloric acid, acetic acid, alcohol, fat, insoluble in water and alkalies and being a valuable washing or wetting agent.

19. As a new product, the condensation product from linseed oil and a mixture of bases, said mixture being obtainable by the action of ammonia on ethylene chloride at 80–120° C. under a pressure of 10 atmospheres and after distilling off the ethylene diamine, said mixture of bases boiling at about 15 mm of mercury between about 90 and 300° C., said product being an oily substance, soluble in dilute hydrochloric acid, acetic acid, alcohol, fat, insoluble in water and alkalies and being a valuable washing or wetting agent.

20. Condensation products of aliphatic fatty acids and polyalkylene polyamines of the probable general formula:

$$Y-CO-NH-A-Z$$

wherein A represents the group $CHR-CHR_1-NH-$ of which there are two or more serially arranged, R and $R_1$ standing for hydrogen or methyl, wherein Y stands for an aliphatic hydrocarbon radical containing at least 9 carbon atoms which hydrocarbon radical may contain one or more double bonds and may be substituted by hydroxy groups, and Z stands for hydrogen or the acidyl radical of an aliphatic acid containing at least 10 carbon atoms, being oily or solid substances, the monoacidyl products being soluble in dilute hydrochloric acid, acetic acid, alcohol, fat, insoluble in water and alkalies, and the diacidyl compounds being soluble in hot alcohol, insoluble in hydrochloric acid, alkalies and water, being valuable wetting agents or intermediate products in the manufacture of wetting agents.

WILHELM NEELMEIER.
THEODOR NOCKEN.
HERMANN FRIEDRICH.